(12) United States Patent
Pearson et al.

(10) Patent No.: US 8,898,078 B2
(45) Date of Patent: Nov. 25, 2014

(54) SCALABLE BILLING WITH DE-DUPLICATION IN AGGREGATOR

(75) Inventors: Malcolm Erik Pearson, Kirkland, WA (US); Matthew Charles Setzer, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 243 days.

(21) Appl. No.: 12/785,305

(22) Filed: May 21, 2010

(65) Prior Publication Data

US 2011/0288974 A1 Nov. 24, 2011

(51) Int. Cl.
  *G06Q 40/02* (2012.01)
  *H04L 12/14* (2006.01)
  *G06Q 20/10* (2012.01)
  *G06Q 30/04* (2012.01)
  *H04M 15/00* (2006.01)
  *G06Q 40/00* (2012.01)

(52) U.S. Cl.
  CPC .............. *H04L 12/14* (2013.01); *G06Q 20/102* (2013.01); *G06Q 30/04* (2013.01); *H04L 12/1428* (2013.01); *H04M 15/00* (2013.01); *H04M 15/41* (2013.01); *H04M 15/43* (2013.01); *H04M 15/44* (2013.01); *H04M 15/70* (2013.01); *H04M 15/73* (2013.01); *G06Q 40/12* (2013.01)
  USPC .......................................................... 705/34

(58) Field of Classification Search
  USPC ......................................................... 705/34
  See application file for complete search history.

(56) References Cited

U.S. PATENT DOCUMENTS

| | | |
|---|---|---|
| 5,680,611 A | 10/1997 | Rail et al. |
| 6,442,748 B1 | 8/2002 | Bowman-Amuah |
| 6,463,270 B1 * | 10/2002 | Chang et al. .................. 455/403 |
| 6,988,124 B2 | 1/2006 | Douceur et al. |
| 7,233,918 B1 | 6/2007 | Ye et al. |
| 7,536,435 B2 | 5/2009 | Campbell et al. |
| 7,577,834 B1 | 8/2009 | Traversat et al. |
| 7,606,745 B1 | 10/2009 | Brumfield et al. |
| 7,640,213 B2 | 12/2009 | Reunert et al. |
| 7,926,099 B1 | 4/2011 | Chakravarty et al. |
| 2001/0034693 A1 | 10/2001 | Farhat et al. |
| 2003/0037022 A1 | 2/2003 | Adya et al. |
| 2003/0153298 A1 | 8/2003 | Eder et al. |
| 2004/0068481 A1 | 4/2004 | Seshadri et al. |
| 2004/0193516 A1 | 9/2004 | Fine et al. |
| 2007/0261063 A1 | 11/2007 | Matousek et al. |
| 2007/0271193 A1 | 11/2007 | Tan |
| 2008/0249936 A1 | 10/2008 | Miller et al. |

(Continued)

OTHER PUBLICATIONS

"Using Bloom Filters"; Perl.com; Ceglowski, Maciej; Apr. 8, 2004 12:00 AM; http://www.perl.com/pub/2004/04/08/bloom_filters.html.*

(Continued)

*Primary Examiner* — Shay S Glass
(74) *Attorney, Agent, or Firm* — Kate Drakos; Sade Fashokun; Micky Minhas

(57) ABSTRACT

Scalable handling of billing events that affect one or more accounts. A computing system partitions received events into a number of channels, perhaps by account identifier. The channels receive the events, process the events, and forwards the events to an aggregator to allow the events to be aggregated by account to allow for easier computation of a bill. The aggregator also performs de-duplication of events to help reduce the risk of double billing.

13 Claims, 4 Drawing Sheets

Computing System
100

(56) References Cited

U.S. PATENT DOCUMENTS

| | | | |
|---|---|---|---|
| 2009/0187546 | A1 | 7/2009 | Hamilton-Whyte |
| 2009/0232289 | A1 | 9/2009 | Drucker et al. |
| 2009/0276771 | A1 | 11/2009 | Nickolov et al. |
| 2010/0023419 | A1* | 1/2010 | Tyler ............................. 705/26 |
| 2011/0035681 | A1* | 2/2011 | Mandel et al. ................ 715/752 |
| 2011/0051661 | A1 | 3/2011 | Venkob et al. |
| 2011/0202500 | A1 | 8/2011 | Warn et al. |
| 2011/0288975 | A1 | 11/2011 | Pearson |
| 2011/0289102 | A1 | 11/2011 | Pearson |
| 2013/0138617 | A1 | 5/2013 | Pearson |

OTHER PUBLICATIONS

Tieyan Li;"An Efficienh Scheme for Encrypted Data Aggregation on Sensor Networks"; complete document. 2006.*

Tieyan Li; Citation/Abstract "An Efficient Scheme for Encrypted Data Aggregation on Sensor Networks"; 2006 IEEE 63re Vehicular Technology Conference (IEEE Cat. NO 06CH37718); 2006.*

Notice of Allowance dated Oct. 2, 2013 cited in U.S. Appl. No. 13/751,668.

Office Action dated Aug. 23, 2012 cited in U.S. Appl. No. 12/785,319.

Notice of Allowance dated Oct. 12, 2012 cited in U.S. Appl. No. 12/785,313.

Office Action dated Apr. 11, 2012 cited in U.S. Appl. No. 12/785,313.

Office Action dated Apr. 10, 2012 cited in U.S. Appl. No. 12/785,319.

Sunrise II: A Scalable and Timely Billing Architecture—Published Date: 1997 http://citeseerx.ist.psu.edu/viewdoc/download?doi=10.1.1.57.2739&rep=rep1&type=pdf (23 pages).

Internet Billing Service Design and Prototype Implementation http://citeseerx.ist.psu.edu/viewdoc/download?doi=10.1.1.41.1796&rep=rep1&type=pdf (19 pages).

Optical Services over the Intelligent Optical Network http://citeseerx.ist.psu.edu/viewdoc/download?doi=10.1.1.121.6806&rep=rep1&type=pdf (6 pages).

Office Action dated Aug. 14, 2014 cited in U.S. Appl. No. 12/785,319.

* cited by examiner

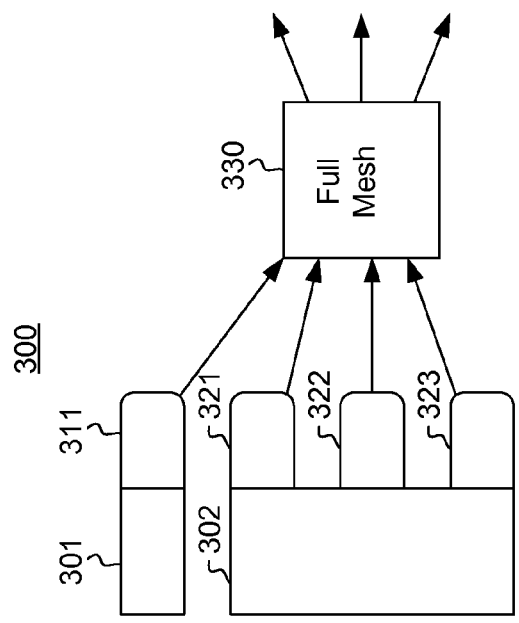

600

700

SCALABLE BILLING WITH DE-DUPLICATION IN AGGREGATOR

BACKGROUND

When a consumer and a provider engage in a contract for goods and/or services, the provider typically creates an account that is associated with a specific consumer for the duration of the relationship between the provider and that consumer. An account is especially useful where payment is not necessarily made at the time the goods were received, or at the time that the service was rendered (such as when payment is made in advanced or payment is made in arrears). As goods are delivered, or as services are rendered, a balance in the account changes to reflect an obligation under the contract for the consumer to pay the provider. Ongoing accounts are typically periodically subjected to a billing cycle, in which the consumer is notified of the balance on the account, and is given a period of time within which to make payment, if some amount is owed. A typical billing cycle is monthly (e.g., in the case of credit cards, mortgage payments, utility bills), but billing cycles might also be quarterly, weekly, annually, or perhaps sporadic and unpredictable. Billing cycles may also be triggered by accumulated resource usage or monetary balance or other events. Web services may be broadly construed as being any service that is offered over the Internet, though Web services may also be offered over other networks or delivery mechanism. Web services may also be a charged for, in some cases.

The process of maintaining an accurate account balance for consumers can be a major part of the operational complexity for a provider. A single provider may have accounts set up with thousands, or even millions, of consumers depending on the success of the provider's business. Thus, a single provider typically tracks account balances for each consumer. In addition, for each individual account, there may be particular events that result in a change in the account balance. For even a single account, there may be hundreds or even thousands of events that each result in a change in the account balance, or which are to be tracked so that the ultimate account balance may be calculated at the end of the billing cycle.

BRIEF SUMMARY

At least one embodiment described herein relates to the handling of events that affect one or more accounts. A computing system receives a number of events in the form of event messages, each of the events having potentially some impact on one or more accounts. The computing system partitions the messages as they are received into one of a number of channels. For instance, each channel might be allocated a particular set of account identifiers. In that case, all events related to a particular account within a set of accounts managed by a channel, will be forwarded to that channel.

The channels receive the events, perhaps perform some processing on the events, and then forward the events to an aggregator that aggregates the events on an account by account basis. The aggregated data is data that is better suitable for constructing billing statements for the consumers associated with each account. The aggregator may also perform de-duplication of events.

This Summary is not intended to identify key features or essential features of the claimed subject matter, nor is it intended to be used as an aid in determining the scope of the claimed subject matter.

BRIEF DESCRIPTION OF THE DRAWINGS

In order to describe the manner in which the above-recited and other advantages and features can be obtained, a more particular description of various embodiments will be rendered by reference to the appended drawings. Understanding that these drawings depict only sample embodiments and are not therefore to be considered to be limiting of the scope of the invention, the embodiments will be described and explained with additional specificity and detail through the use of the accompanying drawings in which:

FIG. 2 illustrates an example event data structure;

FIG. 3 illustrates an environment in which events may be generated;

DETAILED DESCRIPTION

In accordance with embodiments described herein, the handling of events that affect one or more accounts is described. A computing system partitions received events into a number of channels, perhaps by account identifier. The channels receive the events, process the events, and forward the events to an aggregator to allow the events to be aggregated by account to allow for easier computation of a bill. The aggregator may also perform de-duplication of events to help reduce the risk of double billing. First, some introductory discussion regarding computing systems will be described with respect to FIG. 1. Then, embodiments of the scalable billing will be described with respect to FIGS. 2 through 7.

Computing systems are now increasingly taking a wide variety of forms. Computing systems may, for example, be handheld devices, appliances, laptop computers, desktop computers, mainframes, distributed computing systems, or even devices that have not conventionally considered a computing system. In this description and in the claims, the term "computing system" is defined broadly as including any device or system (or combination thereof) that includes at least one processor, and a memory capable of having thereon computer-executable instructions that may be executed by the processor. The memory may take any form and may depend on the nature and form of the computing system. A computing system may be distributed over a network environment and may include multiple constituent computing systems.

Figure 1:
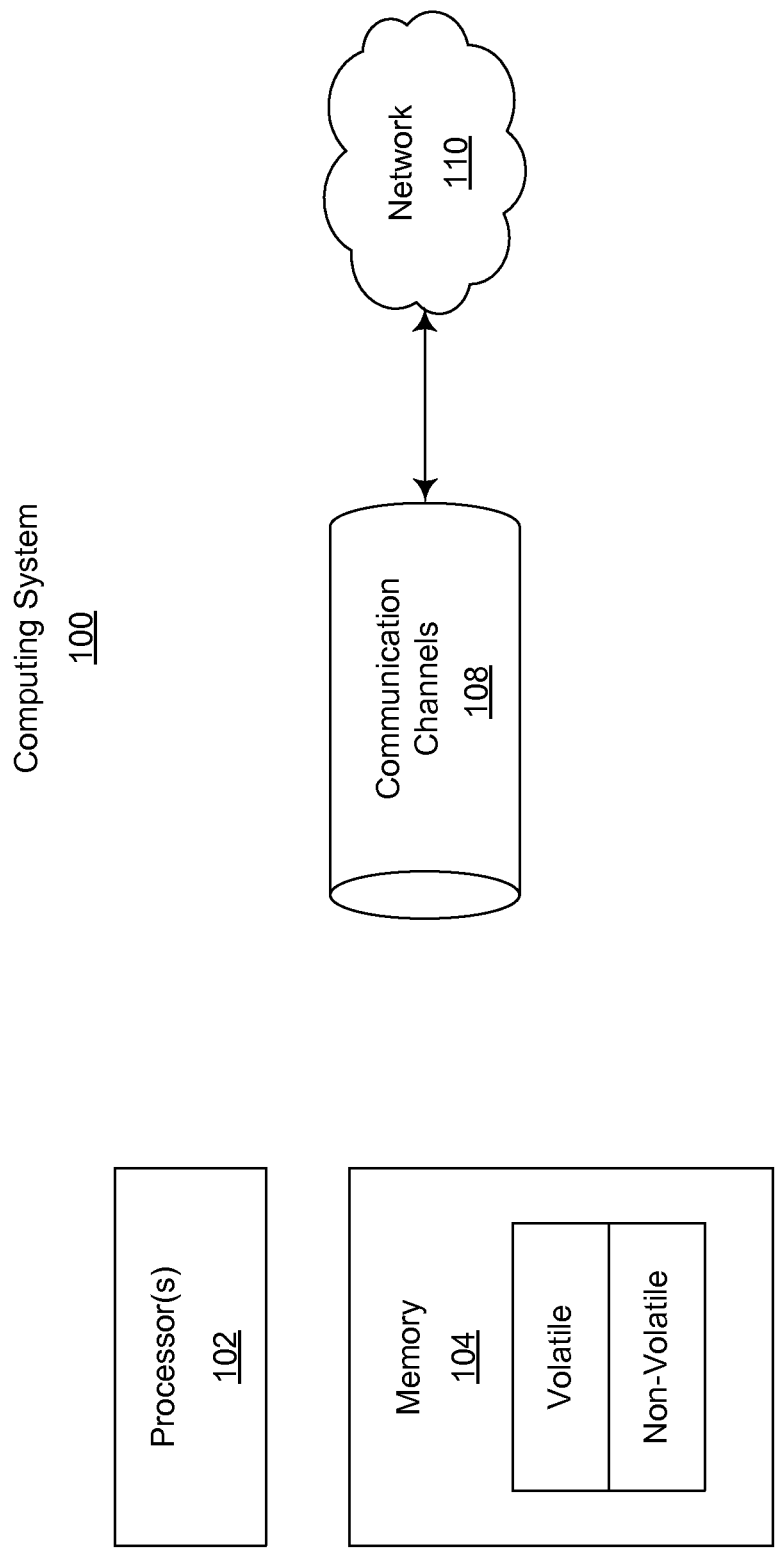
FIG. 1 illustrates an example computing system that may be used to employ embodiments described herein.

As illustrated in FIG. 1, in its most basic configuration, a computing system 100 typically includes at least one processing unit 102 and memory 104. The memory 104 may be physical system memory, which may be volatile, non-volatile, or some combination of the two. The term "memory" may also be used herein to refer to non-volatile mass storage such as physical storage media. If the computing system is distributed, the processing, memory and/or storage capability may be distributed as well. As used herein, the term "module" or "component" can refer to software objects or routines that execute on the computing system. The different components, modules, engines, and services described herein may be implemented as objects or processes that execute on the computing system (e.g., as separate threads).

In the description that follows, embodiments are described with reference to acts that are performed by one or more computing systems. If such acts are implemented in software, one or more processors of the associated computing system that performs the act direct the operation of the computing system in response to having executed computer-executable instructions. An example of such an operation involves the manipulation of data. The computer-executable instructions (and the manipulated data) may be stored in the memory 104 of the computing system 100. Computing system 100 may also contain communication channels 108 that allow the computing system 100 to communicate with other message processors over, for example, network 110.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

The principles described herein provide an efficient mechanism for handling events that have an impact on billing accounts. Prior to describing the handling of events, the content of events will be described with respect to FIG. 2, which illustrates an example event data structure 200. Then, an environment in which the events may be generated will be described with respect to the event generation environment 300 of FIG. 3. Then, the handling of the events in accordance with an example embodiment will be described with respect to FIGS. 4 and 5.

FIG. 2 illustrates an example event data structure 200. The data structure is just an example and is provided primarily to illustrates the types of information that might be present in an event that affects an account for which a consumer may be billed.

The event data structure 200 may include a unique event identifier 201 that is perhaps unique across all events, or at least is unique across a subset of events over which duplication checking occurs. A description of duplicate checking is deferred until further in this description with respect to FIGS. 6 and 7.

The event data structure 200 may also include such information as an account identifier 202, a customer identifier 203, a provider identifier 204, an event time 205, an event description 206, and auxiliary information 207. An account is formulated based on a contractual obligation entered into between a customer and a provider. According to a typical contract, the customer is obligated to pay a certain amount in exchange for the provider providing a particular good or service. As the obligations to pay accumulate, an account balance is altered to incrementally reflect the obligation. The account balance might also be contractually affected by, for example, late fees, refunds, credits, discounts, and the like in accordance with the contract, and in accordance with non-contractual business practice.

The account identifier 202 may be an account identifier recognized by the customer and provider, or may be some other identifier recognized by the billing system described herein.

The customer identifier 203 identifies the customer of the account. However, the event itself need not contain the customer identifier 203 since that may later be inferred based on, for example, the account identifier 202.

The provider identifier 204 identifies the provider of the good or services. Once again, the event itself need not contain the provider identifier 204 since the provider may also be later inferred based on, for example, the account identifier 202.

The event time 205 may specify the time that the action underlying the event occurred, and/or the time that the event was generated. The time of the event might have an impact on billing. For example, a telephone call placed at a particular time might be more or less expensive depending on the time that the call was placed. The event time may also help in sequencing the event as described hereinafter.

The event description may describe the action description 206 that describes the action that underlies the event, and that may have some impact on billing. For instance, an e-mail service might charge a certain amount per received e-mail. A phone service might charge a certain amount per received call. An internet service might charge a certain amount per minute of online activity, or a certain amount per unit data communicated over the internet service. Any action that might have an impact on billing may thus generate an event. For actions that endure for a period of time (e.g., a telephone call), perhaps the event is generated only upon completion of the action, and might specify a duration. For instance, the action description might indicate "phone call—24 minutes". An event might also be generated at the start of the duration and at the end of the duration, with the events correlated and interpreted together from which a duration may be inferred. Duration may be also based on events such as the consumption of a certain quantity of storage in the case of a storage service.

Auxiliary information 207 may include any other information that might be helpful in determining billing information for the corresponding account.

Figure 4:
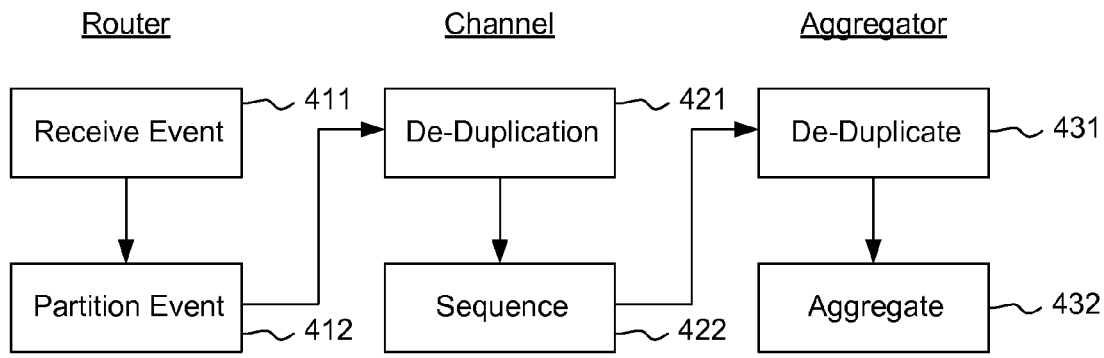
FIG. 4 illustrates a flowchart of a method for handling events.
Figure 5:
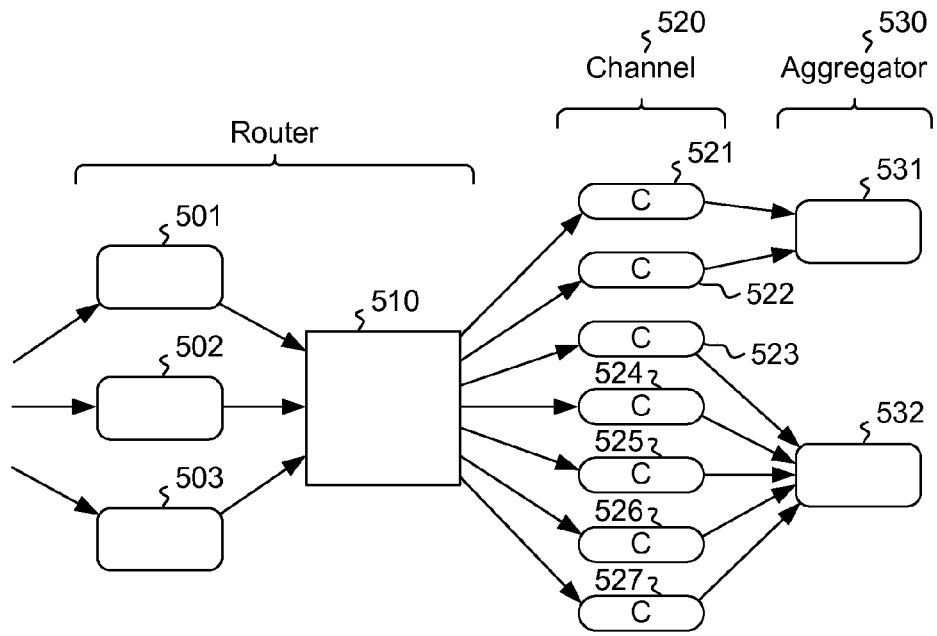
FIG. 5 illustrates an environment in which events may be processed.

FIG. 3 illustrates an environment 300 in which events may be generated and delivered to the billing system illustrated and described with respect to FIGS. 4 and 5. The principles described herein are not limited to any particular environment 300 for generating billing events and delivering such billing events to a billing system. However, the environment 300 is provided as an example only.

The environment 300 includes two services 301 and 302 that are illustrated as examples only. The principles provided herein may operate where there is only one service, or in which there are many services. As an example, perhaps service 301 is an IP-based telephone service. Perhaps service 302 is an e-mail service. However, the principles provided herein are not limited to the type of service. For instance, the principles may operate with stock and mutual fund brokerage services, real estate transaction services, internet access services, online store services, utility providers, or any other service that provides goods or services. The service may have a physical component (e.g., a landscaper service may perform landscaping for a customer's property), but the illustrated service represents an electronic representation of the service (e.g., upon completing a lawn service, the lawn service provider may report the service performed to a software module).

Each service may have one or more usage sources that monitor the service for particular activities that might affect billing. Each usage source may operate independently of the other. For instance, service 301 includes a single usage source 311, while the service 302 includes multiple usage sources 321, 322 and 323. There is no limit to the number of usage sources that may be assigned to a particular service. The number will depend on the designer's preference, and on the nature of the service. For instance, if the service 301 is an IP-based telephone service, perhaps only one usage source is used that simply tracks telephone calls. If the service 302 is an e-mail service, there might be multiple activities that could affect billing. For instance, service 321 might track when an e-mail is sent, service 322 might track when an e-mail is received, and service 323 might track when a particular unit size of data is transferred. This might be helpful in a situation when billing depends on the number of e-mails received, the number of e-mails sent, and the total data transferred.

As each usage source 311, 321, 322 and 323 detects an activity that it is configured to detect, the usage source generates and dispatches an event that describes the activity. Alternatively or in addition, the usage source might buffer events when they are generated, so that the events can be dispatched in batches. The billing system may place constraints on the number of or time periods over which events are delayed due to batching. An example of the structure and content of such events has been described with respect to FIG. 2. The events are dispatched over a network 330, an example of which being the Internet, whereupon they are received at various routing components 501, 502 and 503 of FIG. 5. In one embodiment, the routing components 501, 502, 503 are each instances of the same routing component class.

FIG. 4 illustrates a flowchart of a method 400 for handling the events. Some of the acts of the method may be performed by the routing system of FIG. 5 (listed under the heading "Router") noting that the "routing system" may be distributed and include multiple independent routers. Some of the acts may be performed by the routers 501, 502 and 503 of FIG. 5. Some of the acts may be performed by the aggregators 530 of FIG. 5 (listed under the heading "Aggregator"). The method 400 may be performed for each event received, and will be described with respect to the event handling environment 500 of FIG. 3.

Referring to FIGS. 4 and 5, and as previously described, the events are received (act 411) at one of the routing components 501, 502 or 503. While there may be a single routing component, multiple routing components are illustrated as there may be a high volume of events being received and that are to be routed. The routing components 501, 502, 503 may be stateless, and may, for example, acknowledge receipt of the events to the respective usage source. In one embodiment, multiple events may be dispatched as a collective message from the usage source, each event perhaps associated with a different account. In that case, the routing components also extract each event from the message, and dispatch each individual event through the full-mesh network 510.

Each router partitions the events as they are received to one of multiple channels 520 (act 412). In other words, the router decides which event is to be dispatched to which channel. The principles described herein are not limited to the criteria by which the events are partitioned. However, one example of how they might be partitioned is by geography. For instance, a channel might be responsible for all events whose underlying triggering action occurred within certain geographical boundaries. Alternatively, a channel might be responsible for all events whose customer or provider is situated within certain geographical boundaries. In one embodiment, the events are partitioned in a manner that attempts to apply a uniform distribution of load across the individual channels.

However, one mechanism for partitioning does the partitioning on the basis of the account identifier associated with the event. For instance, each of the channels 520 may be responsible for handling all events whose account identifier falls within a corresponding range. Thus, upon receiving an event, the router 510 might read the account identifier, identify which range the identifier falls in, identify the corresponding channel that is to handle the event, and dispatch the event to that channel for further handling.

Referring to FIG. 5, the channels 520 include seven channels 521 through 527. However, the principles described herein are not limited to the number of channels. There may be as few as one, but perhaps may also be as many as a thousand channels, or even millions of channels, depending on what the computing system is capable of handling, and what makes most sense from a design perspective. In one embodiment, a larger number of channels is used to allow for more flexibility to re-distribute load across physical hardware.

In this example, suppose that channel 523 receives the event. Referring back to FIG. 4, the channel checks that the event is not a duplicate of another event received by the channel (act 421). If it is a duplicate, then the event is discarded or at least not processed further. Perhaps the duplicate is logged so that the effectiveness of the de-duplication process may be evaluated or to detect failures in other parts of the system, but the duplicate event is not permitted to affect billing since doing so would result in a customer perhaps being double billed for the same action.

The principles described herein are not limited to the manner in which de-duplication is performed. In one embodiment, the de-duplication is performed by checking the event identifier against a list of event identifiers already received. To keep that list from growing too large, perhaps the list of event identifiers are kept on a some time-bound basis (such as daily), and when the list becomes a certain age (perhaps a week old), the list is discarded or not checked further. The assumption there is that any duplicate would be received fairly shortly after the original event was received. A primary cause for duplicate messaging may be that the sender of an event re-sends an event when it does not receive acknowledgement due to transient network problems. But perhaps the receiver of the event did receive the event, but the acknowledgement simply was lost in transmission back to the sender of the event.

Once de-duplication is performed, the channel is dealing with only original events, with no duplicates. At this stage, the channel may sequence the events with a channel-specific sequence number (act 422). The channel might also append its channel identifier to the event data structure so that components that subsequently handle the message (such as the aggregator to be described further below) may understand what channel handled the event, and which channel the channel-specific sequence number correlates to. The event is then dispatched to the corresponding aggregator for that channel.

Referring to FIG. 5, the event handling environment 500 includes aggregators 530. In the illustrated case, there are two aggregators 531 and 532. However, the principles described herein are not limited to the number of aggregators. The purpose of the aggregators is to aggregate the billing data received from the event for each account, and present the aggregated data in better form for consumption by the billing algorithm that determines how the aggregated data should affect the account balance for each account. In this embodiment, one or more channels are assigned to each aggregator. For instance, channels 521 and 522 provide their events to the aggregator 531, while the channels 523 through 527 provide their events to the aggregator 532. The channels 520 and aggregators 530, while performing different functions, may (but need not) be implemented on the same physical or virtual machine.

When the event is received, however, the aggregator may do another de-duplication as there may be conditions between the channel and the aggregator that may give rise to the regeneration of duplicates. For instance, perhaps there is reliable messaging between the channel and the aggregator. In that case, the channel or another intermediary between the channel and aggregator might generate a duplicate if it does not receive an acknowledgement, even though an acknowledgement might have been sent.

However, de-duplication is a more efficient task given that there are channel-specific sequence numbers assigned to the event. Thus, the aggregator performs de-duplication (act 431) by tracking a water mark in the sequence number for the corresponding channel, the water mark moving in a movement direction that is the same as that of the sequence number assignment. For instance, the channel might assign a sequence number in the ascending direction in which case the water mark is only increased, and any event received that is lower than the high water mark can be assumed to be a duplicate. For instance, if the channel assigned a sequence number of 15 to the prior event, the channel would assign a sequence number of 16 to the subsequent event.

The aggregator receives events and tracks the high water mark for the sequence number for each channel (in the case in which the sequence number is assigned in the ascending direction). When a subsequent event is received by the aggregator, the aggregator reads the channel-specific sequence number for that event, reads the channel identifier for the channel that handled the event, and compares that sequence number against the channel-specific water mark for that channel. If the channel-specific sequence number is less than the high water mark, the event is treated as a duplicate, and not factored into the aggregation and billing processes.

If the channel-specific sequence number is greater than the high water mark, and the channel-specific sequence is just one higher than the previous high water mark for that channel, then the channel's high water mark is incremented by one, and the event is accepted as an original event, and not a duplicate of another.

If the channel-specific sequence number is greater than the high water mark, and the channel-specific sequence number is more than one higher than the previous high water mark for that channel, then processing might depend on how important those intervening events are to the billing process. For example, suppose the channel-specific high water mark was 15, when an event with a channel-specific sequence number of 18 is received. That would mean the two events assigned with channel-specific sequence numbers of 16 and 17 have not been received. If those events are important to the billing process, then perhaps processing of the event with the sequence number of 18 is delayed for a moment in anticipation of the intervening two events. If those events are not anticipated to be important to the billing process, perhaps the high water mark is adjusted to 18, knowing that if and when the other intervening events (having sequence numbers 16 and 17) are received, those events will be discarded as presumed duplicates even though they are not actually duplicates of another event received by the aggregator.

A similar process may be performed if a channel assigns a decrementing sequence number to an event or any other ordering of identifiers. For example, in the case of a decrementing sequence number ordering, the channel-specific sequence number will be compared against a low water mark, with the water mark being adjusted downwards as new events are received from the channel.

Once the aggregator is confident that a received event is not a duplicate of another previously received event, the aggregator then aggregates the event received from the channel (act 432). Aggregation involves receiving multiple events for an account, and interpreting the multiple events to formulated aggregated data represents the results of evaluation of multiple events. The aggregated data may then be more easily consumed by the billing algorithm.

As an example, an aggregator may sum parameters from multiple events for a given account. For instance, the aggregator may, one a weekly basis, sum all of the phone call minutes that occurred during prime calling periods, and separately sum all of the phone call minutes that occurred outside the prime calling periods. These two sums may then be presented as aggregated data on a weekly basis to the billing algorithm. Other types of summing might involve counting the number of e-mails sent and received from events that indicate that an e-mail was sent, or events that indicate that an e-mail was received.

Aggregation may involve more than just incrementing or summing, but may apply any type of aggregation that is useful for the billing process. For instance, the aggregator may average parameters from multiple events for an account, or perhaps find a minimum or maximum of a parameter from multiple events for an account. A billing function may then calculate the bill for the account based on the aggregated data. For example, there might be a flat fee arrangement for a certain number of units used, with potentially a fee per unit used thereafter. There might also be discounts offered that the billing function takes into consideration, where the discount depends on the meeting of one or more preconditions. There might also be functions that consider the maximum number of units used for a given period, and so forth.

In an alternative embodiment, de-duplication is performed at the aggregator without the channel having previously performed channel-based sequencing. In that case, the aggregator would not rely on any channel-based sequencing, but may instead perform de-duplication in a manner that does not rely on any such sequencing. In another embodiment, there might be some channels that perform sequencing, and some that do not. In that case, the aggregator may choose to performing de-duplication based on the channel-based sequencing if available, or perform de-duplication without relying on sequencing when such sequencing is not available.

Example processes for performing de-duplication in the absence of a channel-specific sequence number will now be described in further detail. Such de-duplication may be performed at the channel, or perhaps at the aggregator. In one embodiment, a Bloom filter is used to determine whether or not an event is a duplicate of another already received. While a single Bloom filter might be used for this purpose, a Bloom filter might be used for given periods of time. For example, suppose that events are checked against previous events received over the past seven days. In that case, it might be more efficient to set up a Bloom filter on a daily basis. Then, as time passes, and a Bloom filter is no longer relevant because the filter corresponds to events received on a particular day that falls outside of the window (e.g., is not within the 7 most recent days), the Bloom filter may simply be discarded.

Figure 6:
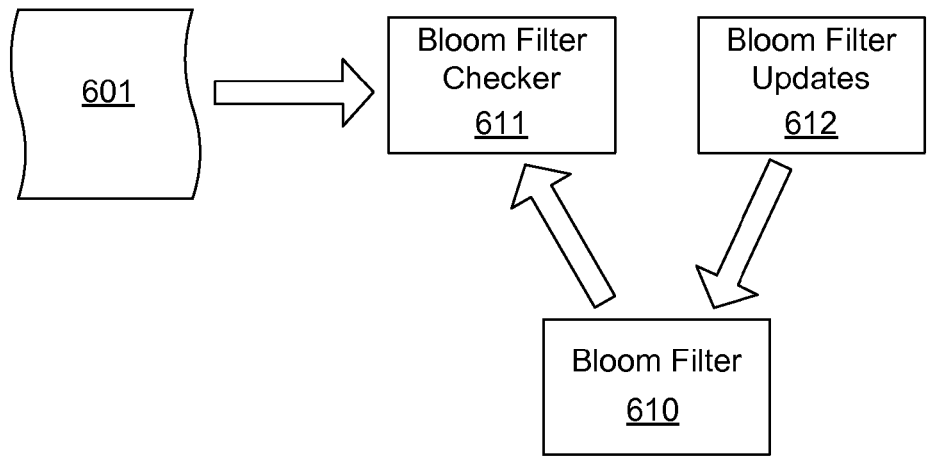
FIG. 6 illustrates a Bloom filter environment that may be used to perform de-duplication.

FIG. 6 illustrates a Bloom filter environment 600 that includes an incoming event 601, a Bloom filter 610, a Bloom filter checker 611 and a Bloom filter updater 612. As previously mentioned, the incoming event 601 will include a unique identifier that uniquely identifies an event in a manner that is unique at least within a channel, and is preferably globally unique. Initially, as a Bloom filter is set up at the beginning of a particular day, the Bloom filter is simply a bit sequence with all bits being reset to a binary zero.

As each event (such as event 601) is received, the event identifier is input into one or more hash algorithms in the Bloom filter checker. The result will be a set of corresponding bit addresses that should be set to one in the Bloom filter. The Bloom filter checker 611 verifies whether or not the corresponding bits are already set to one in the Bloom filter 610.

If not all of the corresponding bits are set to one, this means that an event with that same unique identifier has not been processed by the Bloom filter updater 612. Thus, the event may definitively be determined not to be a duplicate of a prior event. In that case, the Bloom filter updater 612 sets the corresponding bits of the Bloom filter to one, evidencing the receipt of the event.

On the other hand, if all of the corresponding bits are set to one, this means that an event with that same unique identifier might have been processed by the Bloom filter updater 612. However, this cannot be conclusively determined. After all, it is possible that a combination of events with different unique identifiers just happen to set the corresponding bits to one, rather than having a prior event with the same unique identifier cause the corresponding bits to be set to one.

At this stage, if all of the corresponding bits are set to one, then the de-duplication process may perform a number of processes that may perhaps depend on how important it is that non-duplicate events not be thrown out. For instance, for events that have lesser impact on billing (e.g., on the order of a few pennies), it might not be worthwhile to perform further processing to conclusively determine that the event is a duplicate. Instead, the Bloom filter checking may be sufficient (if the corresponding bits are set to one) to estimate within a reasonable probability that the event may be a duplicate of another sufficient to warrant throwing out the event.

For more valuable events, however, perhaps further processing may be performed to make a better estimate on whether the event is a duplicate of another. For instance, perhaps at this point, if the Bloom filter provides a positive match of the corresponding bits, the de-duplication mechanism actually does a comparison of the unique identifier for the current event against the unique identifiers for prior events that have been received by the channel within a given time period (e.g., perhaps seven days). While the de-duplication mechanism might perform this check against prior identifiers in a random fashion, the de-duplication would benefit by having some structure to this checking process that increases the chance that an identifier match may be found sooner.

Figure 7:
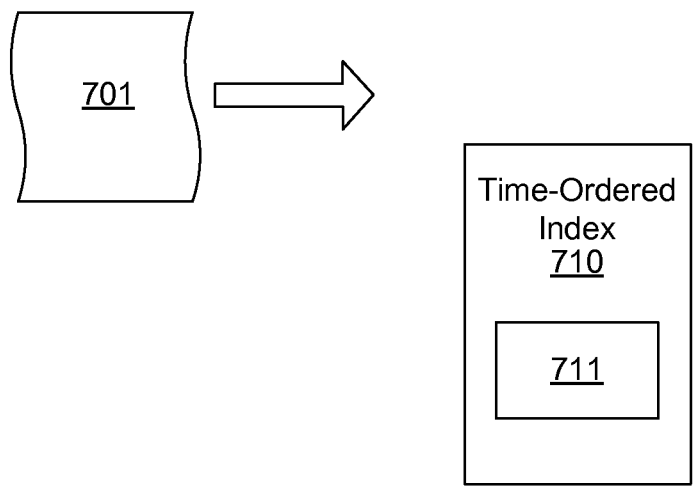
FIG. 7 illustrates a computing environment that uses a time-ordered identifier index.

FIG. 7 illustrates a computing environment 700 that uses a time-ordered identifier index 710. The time-ordered identifier index 710 orders the events first by time, and second by identifier. The use of a time-ordered identifier index 710 may more quickly result in a match of identifiers when duplicate events have a tendency to be received closely in time. For instance, a duplicate event might be received only a few seconds after the original event was received. This might be caused by reliability mechanisms in the messaging channel in which the event was transmitted. If the origin of the event or an intermediate node in the channel does not receive a confirmation of receipt by the next node in the channel, the node might retransmit a copy of the event until confirmation is received. Sometimes, this retransmission might occur in only a matter of seconds or a fraction of a second. Thus, duplicate events may be received within seconds of the original events.

In the time-order index environment 700, when an event 701 is received, the date/time field of the event is checked. In good likelihood, the event 701 is a recent event, and the section 711 of event identifiers from the index 710 corresponding to that time may likely be already in memory. If not, the section 710 of the time-ordered index 710 corresponding to that time may be loaded into memory. If the event is a duplicate event, the identifier may more likely be found in the section 711 corresponding to this time. If not, the next most recent section may be loaded and so forth. Since the index 710 is time-order, this may be more easily accomplished by simply loading sequentially one index section at a time, until the duplicate is found. Thus, event duplicates may more quickly be found that by a method of simply randomly checking event identifiers for all events received over the last seven days.

If the event was a not a duplicate, even though the Bloom filter returned a false positive match, then this mechanism would result in all seven days of time-ordered indexes being checked. This could be overly time-consuming given the value of the event. Accordingly, the amount of time over with the time-ordered index is checked may depend on the value of the event. For instance, for some events of lesser value, even though further checking beyond the Bloom filter was warranted, the event may still not be of sufficient value to warrant checking more than one hour of the time-ordered index. Higher value events may warrant checking one or two days of the time-ordered index. Maximum value events may warrant checking all seven days of available time-ordered indexes. If nothing is found in the time-ordered index after a complete check of seven days, then the event may be determined not to be a duplicate, and further processed. If nothing is found in the time-ordered index after a check of a lesser period in the time-ordered index, then the event may be assumed to be a duplicate (since a complete check was not performed over all substantial possibilities of possible receipt times of the prior original event).

The use of the time-ordered index may be used to further check for duplicates for which the Bloom filter resulted in a positive duplicate estimation. This results in fewer number of reads from the time-ordered index because 1) the use of the Bloom filter will eliminate the need to use the time-ordered index for most (and potentially a substantially majority) of the events received, and 2) even when the Bloom filter indicates a positive determination for a duplication, the use of the time-ordered index will more likely result in the duplicate being found early, perhaps using the sections of the index that are already in memory. Thus, the use of the time-ordered index following a Bloom filter check improves efficiency in read operations.

To improve efficiency in write operations, updates of the Bloom filter and updates of the time-ordered index may be batched. For instance, for Bloom filter updates, if an event is determined not to be a duplicate of another, rather than the corresponding bits being used to immediately update the Bloom filter, corresponding bits for further events are awaited. Once the corresponding bits for a number of events (e.g., one hundred) are queued up, the system might then persist the bit changes in the Bloom filter. In order to provide some security against unintended system failure, the system might use versioning so as to be able to tell the difference between those bits that were set in response to prior events that have been persisted in the Bloom filter, and those bits that should be set in response to prior events that have not yet been persisted in the Bloom filter. Thus, upon restarting the system after a failure, the queue may be repopulated with the corresponding bits. In the case of the use of a queue, not only would the persisted version of the Bloom filter be checked, but also the corresponding bits that are queued to be set, to determine whether all of the corresponding bits of the event are set.

For a time-ordered index, once again, a number of time-ordered identifier write operations may be queued. Once the queue has reached a certain size (e.g., after a hundred identifier write operations have been queued), the queue may be written to the time-ordered index thereby persisting the event receipts. Once again, versioning may be used to determine, after a system shutdown, which time-ordered identifies were persistent already in the time-ordered index, and which time-ordered identifiers were waiting to be persisted.

Through batching of such write operations, the number of write operations may be substantially reduced thereby improving system efficiency. Delete operations may also be batched. For instance, perhaps if there is a daily Bloom filter, then the Bloom filter is deleted at one point during the day in which the Bloom filter because stale (e.g., becomes more than seven days old). Likewise, the time-ordered indexes may be partitioned by time, such that older partitions may be easily deleted in one batch, rather than deleting one identifier at a time.

The reduction of read operations, write operations and delete operations is important for scaling the de-duplication so that a large number of events may be processed. The use of the Bloom filter is also beneficial as it removes a large number of events from having to undergo further de-duplication, because most events would be quickly be determined not to be duplicates of another. In some cases, perhaps Bloom filter checking is all that is done, such that any event that is positively estimated to be a duplicate through the Bloom filter checking (even if a false positive estimation) is treated as though it is a duplicate. This would result in some possible lost billing opportunity, but would eliminate the chance of double billing.

This de-duplication may be performed in the corresponding channel, or in the alternative embodiment may be performed at the aggregator at the time of aggregation. Thus, an efficient mechanism for processing events that have an impact on billing have been described.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method, implemented at a computing system that includes one or more processors, for handling a plurality of events, the method comprising:
   an act of the computing system receiving a plurality of events in the form of event messages, each of at least some of the events affecting one or more of a plurality of accounts;
   an act of the computing system using the one or more processors to partition each of the plurality of events into a corresponding one of a plurality of channels, such that each of the plurality of channels receives a subset of the plurality of events, at least a particular one of the plurality of channels being configured to:
      de-duplicate events by:
         identifying any duplicate events within the corresponding subset of the plurality of events that are received at the particular channel based on a first de-duplication scheme that includes checking first event data; and
         discarding any identified duplicate events, such that the corresponding subset of the plurality of events is a subset of original events only; and
      dispatch each original event in the subset of original events to a corresponding aggregator; and
   an act of the corresponding aggregator processing the events received from the particular channel, including:
      performing an additional de-duplicating of the events received from the particular channel to remove any duplicate events introduced during the dispatch, the additional de-duplicating being performed with a different de-duplication scheme than the first de-duplication scheme and which checks different event data than the first event data that is checked in the first de-duplication scheme; and aggregating the events received from the particular channel.

2. The method in accordance with claim 1, wherein the act of partitioning for an event is determined based on an account identifier associated with the event.

3. The method in accordance with claim 2, wherein each of the plurality of channels handles events for a corresponding set of account identifiers, wherein the act of partitioning for an event is determined by assigning the event to the channel for the corresponding set of account identifiers within which the account identifier for the event resides.

4. The method in accordance with claim 1, wherein the act of partitioning for an event is determined based on a geographical location in which the event occurred, a geographical location associated with a consumer to be charged for the event, or a geographical location associated with a provider to be paid for the event.

5. The method in accordance with claim 1, wherein the act of the corresponding aggregator performing an additional de-duplicating of the events received from the particular channel comprises:

an act of the computing system using Bloom filter to determine that the event is a duplicate of another event; and an act of the computing system updating the Bloom filter to reflect the receipt of the event.

6. The method in accordance with claim 1, wherein the act of the corresponding aggregator performing an additional de-duplicating of the events received from the particular channel comprises:

an act of the computing system using Bloom filter to determine that the Bloom filter is inconclusive as to whether or not the event is a duplicate of another event; and an act of the computing system performing further processing to determine that the event is a duplicate of another event.

7. The method in accordance with claim 1, wherein each of the plurality of events has a unique identifier, wherein the act of the corresponding aggregator performing an additional de-duplicating of the events received from the particular channel comprises:

an act of the computing system comparing the unique identifier of the event to the unique identifiers for previously received events.

8. The method in accordance with claim 1, wherein each of the plurality of events has a unique identifier, wherein the act of the corresponding aggregator performing an additional de-duplicating of the events received from the particular channel comprises:

an act of the computing system using a time-order identifier index to identify duplicates.

9. The method in accordance with claim 1, wherein each of the plurality of events has a unique identifier, wherein the act of the corresponding aggregator performing an additional de-duplicating of the events received from the particular channel comprises:

an act of the computing system using a batched event index to identify duplicates.

10. A computer program product comprising one or more computer storage devices having stored thereon computer-executable instructions that, when executed by one or more processors of a computer system, cause the computer system to carry out a method for handling a plurality of events, including the following:

receiving a plurality of events in the form of event messages, each of at least some of the events affecting one or more of a plurality of accounts;

partitioning each of the plurality of events into a plurality of channels, each of the plurality of events into a corresponding one of a plurality of channels, such that each of the plurality of channels receives a subset of the plurality of events, at least a particular one of the plurality of channels being configured to:

de-duplicate events by:

identifying any duplicate events within the corresponding subset of the plurality of events that are received at the particular channel based on a first de-duplication scheme that includes checking first event data; and discarding any identified duplicate events, such that the corresponding subset of the plurality of events is a subset of original events only; and dispatch each original event in the subset of original events to a corresponding aggregator; and an act of the corresponding aggregator processing the events received from the particular channel, including:

performing an additional de-duplicating of the events received from the particular channel to remove any duplicate events introduced during the dispatch, the additional de-duplicating being performed with a different de-duplication scheme than the first de-duplication scheme and which checks different event data than the first event data that is checked in the first de-duplication scheme; and aggregating the events received from the particular channel.

11. A computer system, comprising:

one or more processors;

system memory; and one or more computer storage devices having stored thereon computer-executable instructions representing the following:

a routing module that is configured to:

receive a plurality of events in the form of event messages, each of at least some of the events affecting one or more of a plurality of accounts; and partition each of the plurality of events one of a plurality of channels;

the plurality of channels, each of the plurality of channels being configured to receive a subset of the plurality of events, and to:

de-duplicate events by:

identifying any duplicate events within the corresponding subset of the plurality of events that are received at the particular channel based on a first de-duplication scheme that includes checking first event data; and discarding any identified duplicate events, such that the corresponding subset of the plurality of events is a subset of original events only; and dispatch each original event in the subset of original events to a corresponding aggregator; and an act of the corresponding aggregator processing the events received from the particular channel, including:

performing an additional de-duplicating of the events received from the particular channel to remove any duplicate events introduced during the dispatch, the additional de-duplicating being performed with a different de-duplication scheme than the first de-duplication scheme and which checks different event data than the first event data that is checked in the first de-duplication scheme; and aggregating the events received from the particular channel.

12. The method of claim 1, wherein the first de-duplication scheme includes checking the event identifier against a list of event identifiers already received.

13. The method of claim 12, wherein the particular channel is also configured to sequence each of the subset of the plurality of events and appending each of the subset of the plurality of events with a corresponding channel sequence number, and wherein the second de-duplication scheme includes checking the channel sequence number.

* * * * *